(12) United States Patent
Wiemeri et al.

(10) Patent No.: US 6,257,818 B1
(45) Date of Patent: Jul. 10, 2001

(54) TREE TRANSPORT MACHINE AND METHOD OF TRANSPORTING FELLED TREES

(75) Inventors: Ronald W. Wiemeri; Terrance A. Fisher, both of Owatonna; Chad K. Jorgensen, Byron, all of MN (US)

(73) Assignee: Blount, Inc., Montgomery, AL (US)

(*) Notice: Subject to any disclaimer, the term of this patent is extended or adjusted under 35 U.S.C. 154(b) by 0 days.

(21) Appl. No.: 09/318,523

(22) Filed: May 25, 1999

(51) Int. Cl.⁷ .................................................. A01G 23/02
(52) U.S. Cl. ........................ 414/23; 414/460; 414/546; 414/555
(58) Field of Search .................... 414/546, 555, 414/460, 729, 731, 739, 23, 21, 910, 911

(56) References Cited

U.S. PATENT DOCUMENTS

| | | | |
|---|---|---|---|
| 2,903,146 | * 9/1959 | Meloy | 414/731 |
| 3,102,563 | * 9/1963 | Horncastle | 414/731 |
| 3,630,246 | * 12/1971 | Hamilton | 414/23 |
| 3,630,399 | * 12/1971 | Hanitz | 414/731 |
| 3,709,390 | * 1/1973 | Tanguay | 414/731 |
| 3,782,567 | * 1/1974 | Likas et al. | 414/729 |
| 3,921,730 | * 11/1975 | Farre et al. | 414/23 |
| 4,486,136 | * 12/1984 | Howard | 414/21 |
| 4,645,410 | * 2/1987 | Royer | 414/729 |
| 4,775,276 | * 10/1988 | McMillan | 414/23 |
| 5,018,932 | * 5/1991 | Croisier | 414/555 |

FOREIGN PATENT DOCUMENTS

2641266 * 7/1990 (FR) .......................... 414/23

* cited by examiner

Primary Examiner—Joseph A. Fischetti
(74) Attorney, Agent, or Firm—Richard G. Lione; Brinks Hofer Gilson & Lione

(57) ABSTRACT

A tree skidder transport machine and method wherein the machine has a hydraulically operated boom assembly extending rearwardly of a chassis. The boom assembly includes a main boom and a stick boom which cooperate hydraulically to lift the bottom end of a tree, or tree bunch, near the butt, and drag it forwardly over a bogied pair of chassis support wheels. With the further cooperation of a hydraulically actuated heel boom, the tree or tree bunch is then rotated vertically in a counterclockwise direction to lift its top end off the ground and move the tree or tree bunch forwardly a sufficient distance to bring some of the weight of the tree or tree bunch onto the front wheels of the machine.

10 Claims, 3 Drawing Sheets

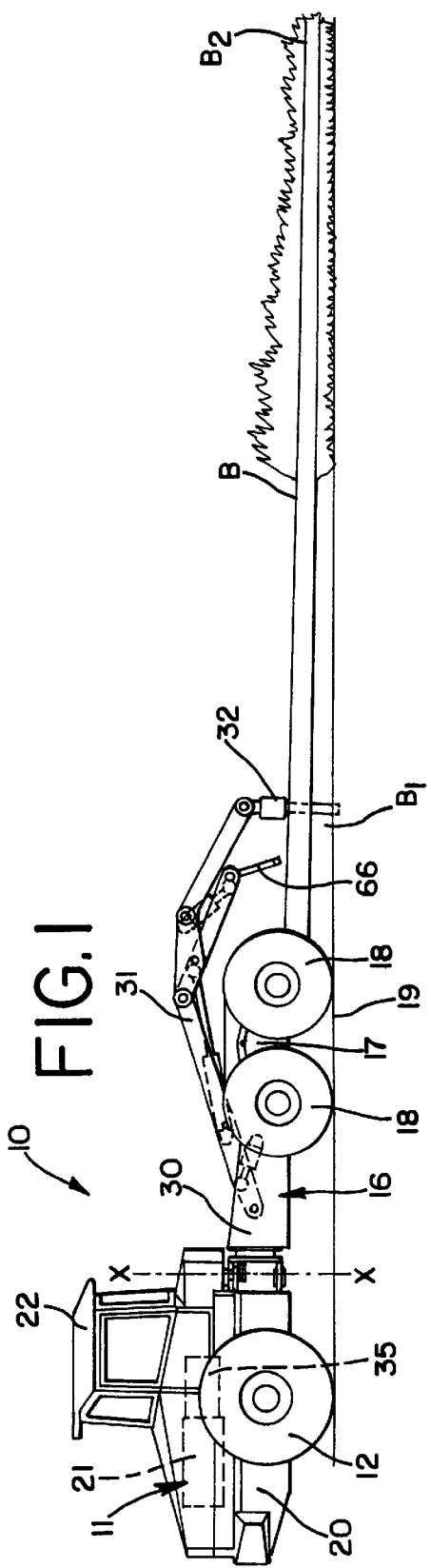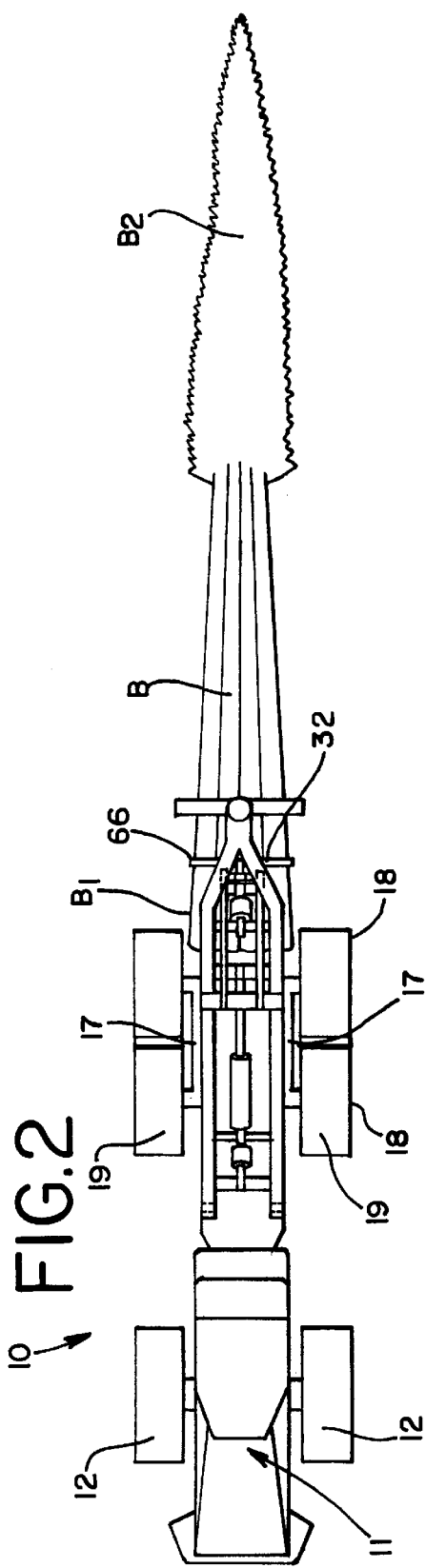

TREE TRANSPORT MACHINE AND METHOD OF TRANSPORTING FELLED TREES

FIELD OF THE INVENTION

This invention relates generally to timber harvesting machines. It relates particularly to a type of timber harvesting machine commonly referred to as a skidder.

BACKGROUND OF THE INVENTION

Skidder machines conventionally take the form of articulated frame, rubber-tire tractors. A front section supported by front drive wheels includes the engine and the operators' cab. A rear section supported by rear drive wheels is connected to the front section on a vertical axis pivot so as to be articulatable relative to the front section. The front and rear wheels are driven by conventional drive trains from the engine through a gear box controlled by the operator. Steering is accomplished by varying the angular relationship between the front and rear sections with a hydraulic cylinder steering system Timber Jack, Caterpillar and John Deere & Co., as well as others, manufacture skidder machines of the aforedescribed nature. Caterpillar also manufactures track skidder machines, i.e., machines where continuous drive tracks replace the four wheels.

Regardless of whether the skidder machine is wheel or track driven, loggers have found skidders to be the most versatile and cost-effective way to bring in felled trees, terrain and other conditions permitting. A hydraulically controlled boom extending rearwardly from the rear section of the skidder machine grasps a tree or a bunch of trees at a lower end with a grapple or cable loop. The boom is actuated to raise that end of the bundled trees, for example, off the ground and hold them suspended in the air behind the rear wheels of the skidder machine while the machine drags or "skids" the trees out of the forest to waiting transport.

Conventional machines which are constructed and operate in the aforedescribed manner are versatile and cost-effective, as has been pointed out. However, because the trees are lifted by the grapple, for example, at their lower ends and carried behind the rear wheels, both the rear wheels and the tops of the bundled trees caused substantial ground disturbance. The weight of the lifted trees at their lower ends and the counter-weight effect of the machines front end cause the rear wheels to rut and shear soil as they exert traction. The tops of the trees dragged along the ground also cause substantial ground disturbance. In addition, the trees frequently suffer damage as they are skidded out of the logging area.

BRIEF SUMMARY OF THE INVENTION

An object of the present invention is to provide an improved tree transport machine to replace conventional skidders.

Another object is to provide a tree transport machine which can transport trees from the logging site with minimal ground disturbance.

Still another object is to provide a tree transport machine which requires less tractive effort in transporting trees from a logging site than conventional transport skidders.

A further object is to provide a tree transport machine which delivers cleaner trees to their destinations, i.e., trees which have not been damaged by skidding.

Still a further object is to provide a tree transport machine wherein the lower ends of the trees are supported significantly ahead of the center line of the rear tires and the tops of the trees are partially or completely off the ground.

Yet a further object is to provide an improved method of transporting felled trees from the area where they are felled.

The foregoing and other objects are realized with a tree transport machine wherein the rear section of the machine is supported by a pair of wheels on each side. Each pair of wheels is mounted on a bogie which, in turn, is pivotally connected to the rear machine section.

In one embodiment of the invention, the wheels on each bogie are rubber-tire wheels. In another embodiment, each bogie may have a continuous track encircling the rubber tires. In either case, the rear machine section is supported on a relatively wide (fore-to-aft) footprint.

A hydraulically actuated boom assembly is mounted on the rear machine section. It includes a main boom extending upwardly from, and pivotally mounted on, the rear machine section at the front end of its chassis. A hydraulic actuator cylinder pivotally mounted on the chassis rearwardly of the main boom has its actuator piston pivotally connected to the boom to facilitate pivoting the main boom rearwardly and forwardly under the control of the operator.

Extending rearwardly from the main boom, and pivotally connected to its upper end, is a stick boom. The rear end of the stick has a grapple or cable suspended from its free end; the cable or grapple being readily connectable to a felled tree on the ground in a generally conventional manner. A hydraulic actuator cylinder intermediate the ends of the main boom has its actuator piston pivotally connected to the stick boom at a point rearwardly of its connection to the main boom to provide the stick boom with desired lifting force at its grapple or cable end.

According to the invention, a heel boom is also pivotally connected to the main boom and extends rearwardly beneath the stick boom. The heel boom is slightly more than one-half as long as the stick boom so that its free end is forward of the free end of the stick boom; about two-fifths of the distance between the stick boom's free end and the pivot of the stick boom.

An actuator cylinder for the heel boom is pivotally connected to the stick boom intermediate its ends. This actuator cylinder has its piston pivotally connected to the free end of the heel boom. Rigidly connected to the free end of the heel boom, and depending therefrom, is a tree-heeling fork.

In operation of the transport machine according to the method of the invention, the machine is maneuvered into a position where it is longitudinally aligned with and facing forwardly from the larger lower end of a felled tree or bunch of trees. The main boom and stick boom are moved to their rearwardly most inclined positions so that the grapple or cable can grasp the tree bunch (for example) about six feet from the lower end of the bunch.

The actuator cylinders for the main boom and stick boom are then actuated in coordinated fashion by the operator to raise the lower end of the tree bunch and drag it forwardly over the bogied rear section of the machine. When the lower end of the bunch has reached a point just forward of the centerline of the bogies, the actuator cylinder for the heel boom is energized to bring the free end of the tree heeling fork down perpendicular to, and into engagement with, the tree bunch adjacent its lower end.

At this point, the actuator cylinders for the main boom and the stick boom are actuated in coordinated fashion to pivot the main boom further forward and the heel boom further downward. The effect, according to the invention, is to pull the tree bunch forward so that its lower end is well forward of the bogied wheels and its top is raised off the ground. The tree bunch can then be moved out of the logging area with the tree tops lifted off the ground and a portion of the weight of the bunch also borne by the front wheels.

BRIEF DESCRIPTION OF THE DRAWINGS

The invention, including its construction and method of operation, is illustrated more or less diagrammatically in the drawings in which:

FIG. 1 is a side elevational view of a transport machine embodying features of the present invention pictured as it is about to begin to lift a bunch of felled trees into transport position;

FIG. 2 is a top plan view of the machine and bunch of trees seen in FIG. 1, in slightly smaller scale and with parts removed;

DESCRIPTION OF THE PREFERRED EMBODIMENT

Figure 3:
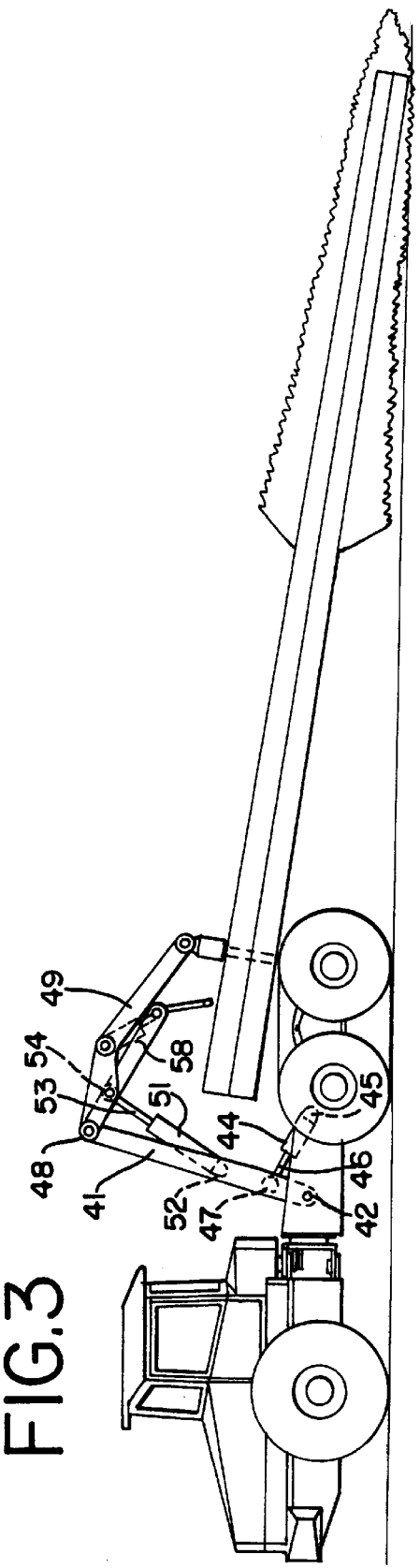
FIG. 3 is a side elevational view, similar to FIG. 1, showing the machine about half-way through its tree bunch lifting operation.

Referring now to the drawings, a felled tree transport skidder machine embodying features of the present invention is shown generally at 10. The machine 10 includes a front section 11 supported by two rubber-tire front wheels 12 and a rear section 16 supported by a pair of two-wheel bogies 17. Each bogy 17 includes two rubber-tire wheels 18. As shown, it may also include a continuous track 19 which encircles both tires and rotates with the wheels 18.

The front section 11 of the transport machine 10 includes a chassis 20 which contains a conventional engine 21 and an operator's cab 22. The front section 11 is joined to the rear section 12 in a conventional manner for articulation about the pivot axis X.

The rear section 12 of the machine 10 includes a chassis 30. Mounted on the chassis 30 is a boom assembly 31. The boom assembly has a conventional grapple 32 suspended from its free end. In FIGS. 1 and 2, the grapple 32 is shown having just grappled a bunch B of felled trees.

The front wheels 12 and rear wheels 18 of the machine 10 are both driven by the engine 21 through a conventional gear box and drive train (not shown). The machine is steered in a conventional fashion by varying the angle between the articulated front section 11 and rear section 16 with hydraulic cylinders (not shown) controlled by the operator. Hydraulic power is supplied by a suitable pump set 35 driven from the engine 21 in a conventional manner.

The hydraulic pump set 35 also supplies power to the boom assembly 31, which is hydraulically actuated in a manner hereinafter discussed. According to the invention, the boom assembly 31 operates in three stages to (1) lift the bottom end of the tree bunch B upwardly, and pull the bunch forwardly until it is over the center line of the bogied wheels 18, (2) force the bottom end $B_1$ of the bunch B downwardly about the axis of the grapple 32 to raise the top end $B_2$ of the bunch off the ground and, simultaneously, (3) pull the tree bunch B forwardly so that the lower end $B_1$ is well in front of the centerline of the bogied wheels 18 (see FIG. 3).

Figure 4:
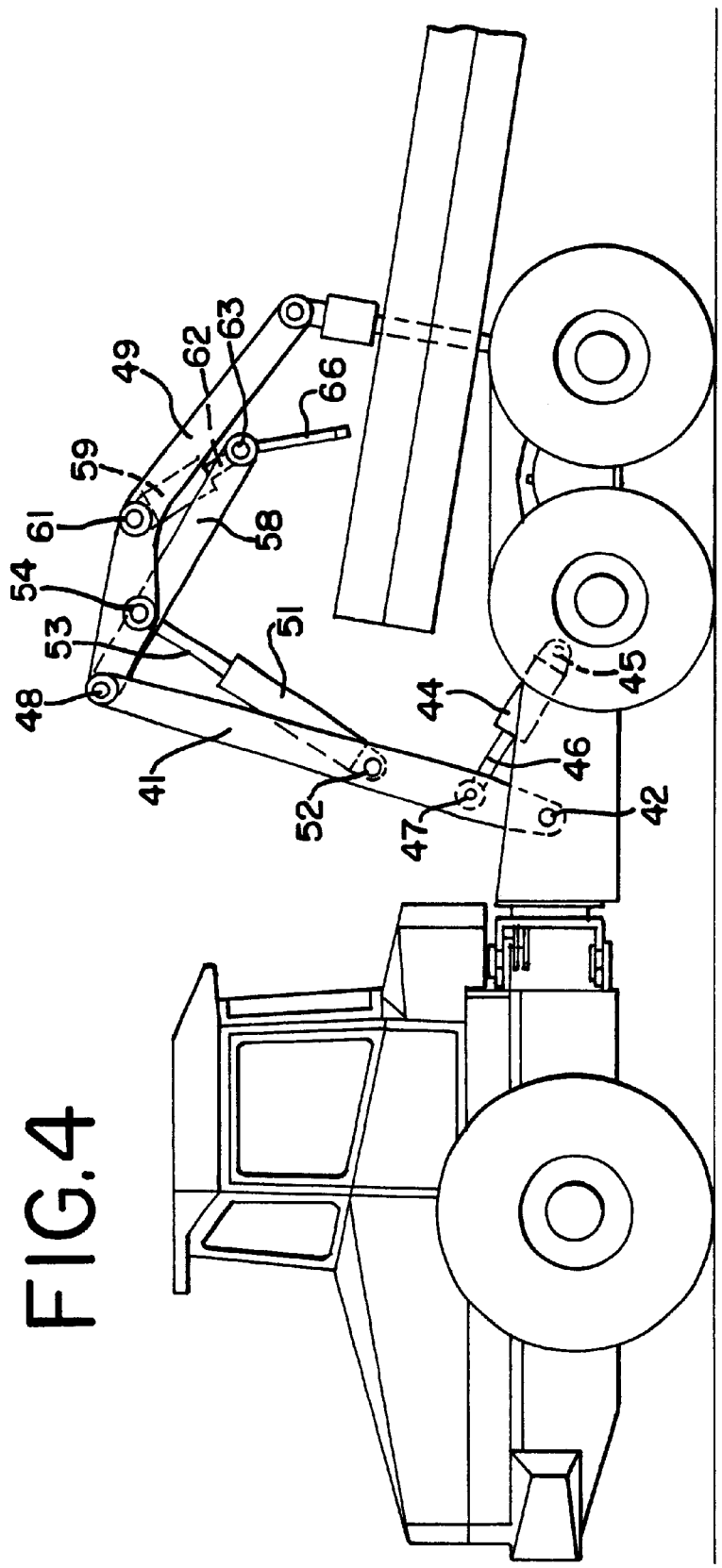
FIG. 4 is an enlarged side elevational view of the machine in the position seen in FIG. 3.

Referring now particularly to enlarged FIG. 4, as well as FIGS. 1 and 2, the assembly 31 is seen to include a main boom 41 which is pivotally mounted on the chassis 30 of the rear section 16 at 42. AS seen in FIG. 2, the main boom 41 comprises parralled boom arms, both of which are pivotally mounted on the chassis 30. The main boom 41 is mounted for pivotal movement between a forwardmost position about 15° forward of vertical and a rearwardmost position about 75° rearward of vertical (see FIG. 1).

The travel of the main boom 41 is controlled by a hydraulic cylinder 44 pivotally connected at 45 to the chassis 30 in front of the pivot 42. The cylinder piston 45 of the cylinder 44 is, in turn, pivotally connected to the main boom 41 at a position 47 displaced from the pivot 42.

Pivotally connected to the free end of the main boom 41 at 48 is a stick boom 49. As seen in FIG. 2, the stick boom 49 also comprises parralle boom arms, each of which is pivotally connected to a corresponding boom arm in the main boom 41. The parralle boom arms of the stick boom 49 then converge and meet at a trailing free end. The stick boom 49 is mounted for pivotal movement relative to the main boom 41 from an angle of about 175° to the main boom (see FIG. 1) to an angle of about 60° to the main boom (see FIG. 5).

The travel of the stick boom 49 relative to the main boom 41 is controlled by a hydraulic cylinder 51 pivotally connected to the main boom 41 at 52. The cylinder piston 53 of the cylinder 51 is, in turn, pivotally connected to the stick boom 49 at a position 54 displaced from the pivot 48.

Suspended from the free end of the stick boom 49, at 56, is the conventional grapple 32. The grapple 32, or a cable, is used in a well-known manner to grasp the bundle B of felled trees during operation of the machine 10.

Pivotally connected to the free end of the main boom 41, on the same pivot 48 to which stick boom 49 is connected, is a heel boom 58. As seen in FIG. 2, the heel boom 58 also comprises parralle boom arms. They are closer together than the parallel boom arms of the stick boom 49 so that the heel boom 58 is pivoted to the end of the main boom 41 between the stick boom 49 arms. The heel boom 58 is about three fourths the length of stick boom. Its position relative to the stick boom 49 is controlled by a hydraulic cylinder 59 pivoted at 61 to the stick boom. The piston 62 for the cylinder 59 is pivotally connected to the free end of the heel boom 58 at 63.

Figure 5:
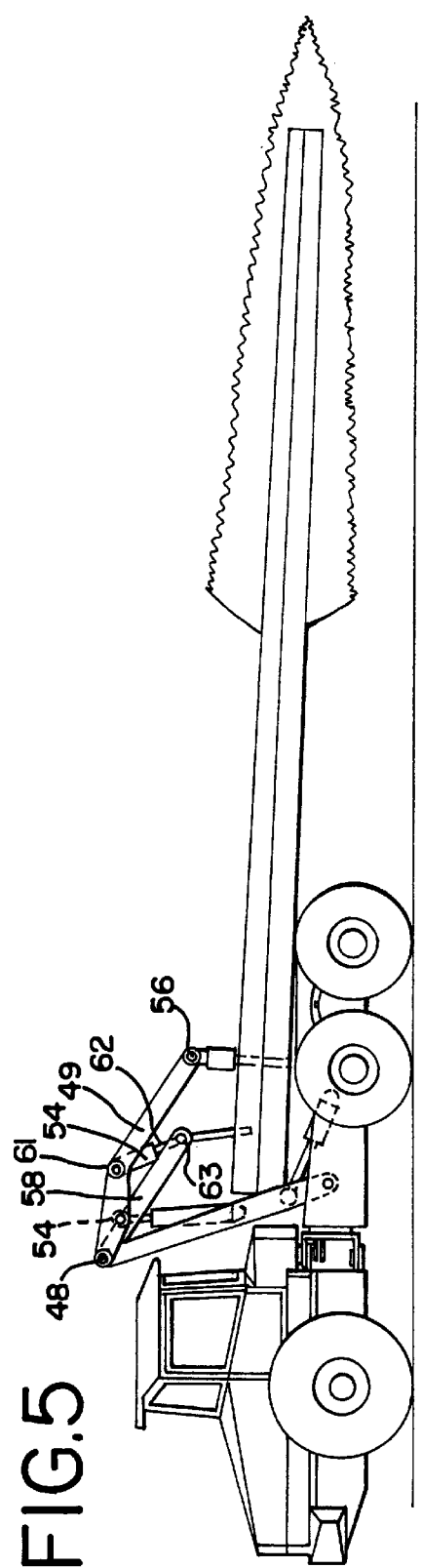
FIG. 5 is a side elevational view, similar to FIGS. 1 and 3, showing the machine with the tree bunch lifted into transport position.

Rigidly connected to the free end of the heel boom 58 is a tree heeling fork 66. The fork 66 extends downwardly at an angle of approximately 45° to the longitudinal axis of the heel boom 58 so that when this boom is inclined downwardly, as seen in FIG. 5, the fork 66 is inclined forwardly from the vertical at an angle of only 5°.

In operation, the machine 10 is maneuvered into the position shown in FIG. 1. The boom assembly 31 is normally retracted into the position shown in FIG. 5 for this maneuvering. The cylinder 44 has been actuated to move the main boom 41 into its forwardmost position. The cylinder 51 has been actuated to move the stick boom 49 into a position displaced 60° from the main boom 41. The position of the stick boom 58 at this point is a matter of choice.

With the machine 10 in position, the cylinder 44 is actuated to retract its piston 46 and pivot the boom 41 into the position shown in FIG. 1. At the same time, the cylinder 51 is actuated to extend its piston 53 and move the stick boom 49 into the position also seen in FIG. 1. The cylinder 59 is actuated to retract its piston 62 and pivot the heel boom 58 toward the stick boom 49 as far as it will travel.

The operator then uses the grapple 32 to grapple the tree bunch B at a location in the lower end B₁ of the bunch, about six feet from that butt end. After the grapple 32 is secured to the bunch B of trees, the cylinder 44 is actuated to drive the piston 46 forwardly and pivot the main boom 41 forwardly. Simultaneously, the cylinder 51 is actuated to retract its piston 53 until the stick boom 49 is positioned at an angle of 175° to the main boom 41. In this operation, the felled tree bunch B is lifted at its lower end B₁, and pulled forwardly into the position shown in FIGS. 3 and 4.

At this point, the lowermost end of the tree bunch B is over the centerline of the wheel bogies 17. The top of the tree bunch B is resting on the ground. The heeling fork 66 is positioned over the end B₁, of the tree bunch, about two feet from the butt of the bunch. The top end B₂ of the felled tree bunch B is resting on the ground.

The cylinder 59 for the heel boom 58 is then actuated to bring the heeling fork 66 down into engagement with the tree bunch B immediately adjacent the lower end B₁ and well in front of the point at which the grapple 32 secures the tree. This pivots the auxiliary boom 58 downwardly until it is substantially parallel to the stick boom 49 between the pivot 61 of the cylinder 59 and the pivot 56 where the grapple 32 is connected.

The operator then actuates the cylinder 44 to drive the main boom 41 forwardly. Simultaneously, the cylinder 51 is actuated to pull the stick boom 49 downwardly. The effect is to pull the tree bunch B forwardly and, at the same time, press the butt of the bunch B downwardly.

As this takes place, the tree bunch B moves forwardly and rotates in a counterclockwise direction about the axis formed by the grapple pivot 56 point. Forward movement and rotation of the tree bunch B continues until the bunch has reached the position shown in FIG. 5, with the bunch disposed approximately parallel to the ground. The machine 10 can then transport the tree bunch B easily out of the logging area.

It will be seen, of course, that the top end B₂ of the tree bunch needn't be lifted completely off the ground to achieve many of the purposes of the invention. Merely relieving a substantial portion of its load bearing effect on the ground serves to improve transport results.

For purposes of illustration, the main boom 41 and stick boom 49 are shown in FIG. 2 with single hydraulic actuator cylinders between their respective boom arms. As readily understood by those skilled in the art, however, each boom arm would conventionally have an actuator.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. A vehicular machine for transporting felled trees, comprising:
   a. a chassis supported by revolving support members; and
   b. a boom assembly mounted on said chassis;
   c. said boom assembly including a main boom pivotally mounted on said chassis, a stick boom pivotally connected to said main boom and a heel boom with an upper end pivotally connected to at least one of said main boom and said stick boom, said heel boom having a lower free end;
   d. said boom assembly further including hydraulic cylinder and piston assemblies for pivoting said main boom, said stick boom and said heel boom, said hydraulic cylinder and piston assemblies including a hydraulic cylinder and piston assembly connected at one end to said stick boom and at an opposite end to said heel boom adjacent the lower free end of said heel boom;
   e. said boom assembly further including a grasping element on said stick boom for grasping a felled tree at a first location displaced from the bottom butt end of the felled tree; and
   f. said boom assembly further including a heeling element on said heel boom for engaging the felled tree at a second location on the tree closer to its butt end than said first location.

2. The vehicular machine of claim 1 further characterized in that:
   a) said heeling element is rigidly connected to said heel boom.

3. A vehicular machine for transporting felled trees, comprising:
   a) a chassis supported by revolving support members;
   b) a boom assembly mounted on said chassis;
   c) said boom assembly including a main boom pivotally connected to said chassis and pivotable between a forwardmost position forward of vertical and rearward most position rearward of vertical, a stick boom pivotally connected to said main boom, said stick boom having a tree grasping element connected thereto, and a heel boom pivotally connected to said main boom;
   d) said boom assembly being operable to grasp and lift a felled tree with said tree gripper at a first location on the tree displaced from its largest end while, at the same time, engaging and exerting a depressing force on the felled tree with said heel boom at a second location on the tree closer to its largest end.

4. The vehicular machine of claim 3 further characterized in that:
   a) said revolving support members including a pair of bogies supporting said chassis and a pair of wheels displaced longitudinally of said chassis and supporting each of said bogies.

5. The vehicular machine of claim 4 further characterized in that:
   a) said wheels are rubber-tired wheels.

6. The vehicular machine of claim 4 further characterized in that:
   a) said pair of wheels in each bogie having an endless track encircling them.

7. A vehicular machine for transporting trees, comprising:
   a) a front vehicle section and a rear vehicle section pivotally connected in articulated relationship;
   b) said rear section being supported by multi-wheeled bogies;
   c) a boom assembly mounted on said rear section;
   d) said boom assembly including a main boom pivotally mounted on said rear section, a stick boom pivotally connected to said main boom and a heel boom pivotally connected to one of said main boom and said stick boom;
   e) said boom assembly further including hydraulic cylinder and piston assemblies for pivoting said main boom and said stick and heel booms;
   f) said main boom being pivotable by a hydraulic cylinder and piston assembly between a forwardmost position forward of vertical and a rearwardmost position rearward of vertical;

g) said boom assembly further including a grasping element on said stick boom for grasping a felled tree at a first location displaced from the bottom butt end of the felled tree; and h) said boom assembly further including a heeling element on said heel boom for engaging the felled tree at a second location on the tree closer to its butt end than said first location.

8. A vehicular machine for transporting felled trees, comprising:

a) a chassis supported by revolving support members;

b) a boom assembly mounted on said chassis;

c) said boom assembly including a main boom pivotally connected to said chassis, a stick boom pivotally connected to said main boom, said stick boom having a tree grasping element connected thereto, and a heel boom pivotally connected to one of said main boom and said stick boom;

d) said main boom being pivotable between a forwardmost position forward of vertical and a rearwardmost position rearward of vertical;

e) said boom assembly being operable to grasp and lift a felled tree with said tree gripper at a first location on the tree displaced from its largest end while, at the same time, engaging and exerting a depressing force on the felled tree with said heel boom at a second location on the tree closer to its largest end.

9. A vehicular machine for transporting felled trees, comprising:

a) a chassis supported by revolving support members; and b) a boom assembly mounted on said chassis;

c) said boom assembly including a main boom pivotally mounted on said chassis, a stick boom pivotally connected to said main boom and a heel boom pivotally connected to at least one of said main boom and said stick boom;

d) said boom assembly further including hydraulic cylinder and piston assemblies for pivoting said main boom, said stick boom and said heel boom, said hydraulic cylinder and piston assemblies including a hydraulic cylinder and piston assembly connected at one end to said stick boom and at an opposite end to said heel boom adjacent the free end of said heel boom;

e) said boom assembly further including a grapple element on said stick boom for grasping a felled tree at a first location displaced from the bottom butt end of the felled tree;

f) said boom assembly further including a heeling element on said heel boom for engaging the felled tree at a second location on a tree closer to its butt end than said first location;

g) said main boom being pivotable by a cylinder and piston assembly between a forwardmost position forward of vertical and a rearwardmost position rearward of vertical.

10. The vehicular machine of claim 9 further characterized in that:

a) said main form is pivotable between a forwardmost position about 15° forward of vertical and a rearwardmost position about 75° rearward of vertical.

* * * * *